(12) United States Patent
Huang et al.

(10) Patent No.: US 10,908,021 B2
(45) Date of Patent: Feb. 2, 2021

(54) SPECTROSCOPIC DEVICE AND IMAGING DEVICE

(71) Applicant: NEC Corporation, Tokyo (JP)

(72) Inventors: Chenhui Huang, Tokyo (JP); Masahiro Tanomura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 101 days.

(21) Appl. No.: 16/341,133

(22) PCT Filed: Sep. 21, 2017

(86) PCT No.: PCT/JP2017/034067
§ 371 (c)(1),
(2) Date: Apr. 11, 2019

(87) PCT Pub. No.: WO2018/070206
PCT Pub. Date: Apr. 19, 2014

(65) Prior Publication Data
US 2019/0242749 A1    Aug. 8, 2019

(30) Foreign Application Priority Data

Oct. 12, 2016  (JP) .................................. 2016-201022

(51) Int. Cl.
*G01J 3/18* (2006.01)
*G01J 3/02* (2006.01)
(Continued)

(52) U.S. Cl.
CPC ................. *G01J 3/18* (2013.01); *G01J 3/021* (2013.01); *G01J 3/0205* (2013.01);
(Continued)

(58) Field of Classification Search
CPC ........ G01J 3/0205; G01J 3/021; G01J 3/0229; G01J 3/0237; G01J 3/18; G01J 3/2823;
(Continued)

(56) References Cited

U.S. PATENT DOCUMENTS

| | | | |
|---|---|---|---|
| 6,735,012 B2 * | 5/2004 | Hunt ...................... | G02B 26/06 359/279 |
| 2003/0053052 A1 | 3/2003 | Braun et al. | |
| 2017/0192217 A1 * | 7/2017 | Fukuyama ......... | G02B 27/0068 |

FOREIGN PATENT DOCUMENTS

| | | |
|---|---|---|
| CN | 102818631 A | 12/2012 |
| JP | 2001-036471 A | 2/2001 |

(Continued)

OTHER PUBLICATIONS

International Search Report for PCT/JP2017/034067 dated Nov. 28, 2017 (PCT/ISA/210).
Written Opinion for PCT/JP2017/034067 dated Nov. 28, 2017 (PCT/ISA/237).

*Primary Examiner* — Hina F Ayub
(74) *Attorney, Agent, or Firm* — Sughrue Mion, PLLC

(57) ABSTRACT

A spectroscopic device and the like that are capable of fast spectral dispersion are provided. The spectroscopic device includes: a modulation unit for converting wavefront shapes of light according to wavelengths; and a demodulation unit for changing a phase of light of a selected wavelength within the light whose wavefront shapes have been converted, in such a way that the light changes into a predetermined state.

14 Claims, 12 Drawing Sheets

(51) Int. Cl.
  *G01J 3/40* (2006.01)
  *G01J 3/36* (2006.01)
  *G01J 3/32* (2006.01)
  *G01J 3/28* (2006.01)
  *G01J 9/00* (2006.01)

(52) U.S. Cl.
  CPC ............ *G01J 3/0229* (2013.01); *G01J 3/0237* (2013.01); *G01J 3/2823* (2013.01); *G01J 3/32* (2013.01); *G01J 3/36* (2013.01); *G01J 3/40* (2013.01); *G01J 9/00* (2013.01)

(58) Field of Classification Search
  CPC ........ G01J 3/32; G01J 3/36; G01J 3/40; G01J 9/00
  See application file for complete search history.

(56) References Cited

FOREIGN PATENT DOCUMENTS

| | | |
|---|---|---|
| JP | 2002-525596 A | 8/2002 |
| JP | 2002-544553 A | 12/2002 |
| JP | 2005-512075 A | 4/2005 |
| JP | 2009-526984 A | 7/2009 |
| JP | 2011-053150 A | 3/2011 |
| JP | 2015-055819 A | 3/2015 |
| JP | 2016-168192 A | 9/2016 |
| WO | 2016/056147 A1 | 4/2016 |

\* cited by examiner

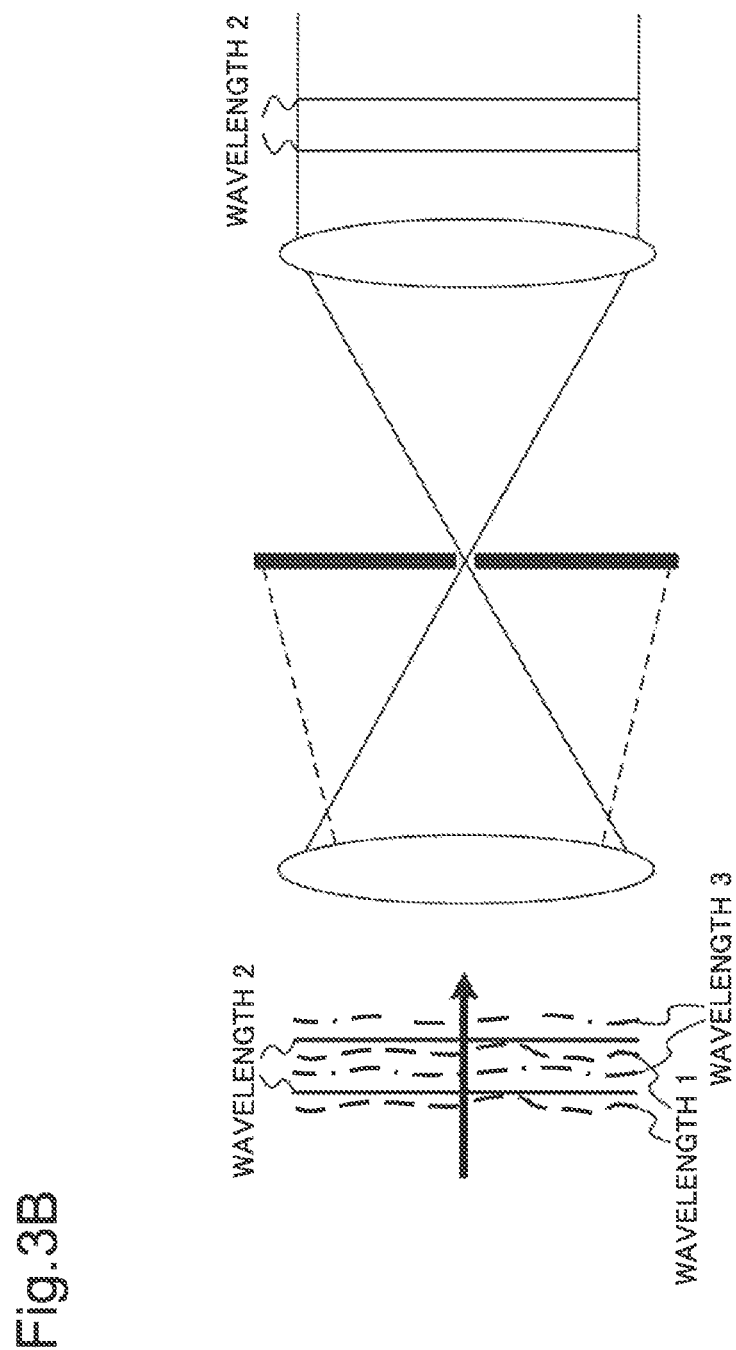

SPECTROSCOPIC DEVICE AND IMAGING DEVICE

CROSS REFERENCE TO RELATED APPLICATIONS

This application is a National Stage of International Application No. PCT/JP2017/034067 filed Sep. 21, 2017, claiming priority based on Japanese Patent Application No. 2016-201022 filed Oct. 12, 2016, the disclosure of which is incorporated herein in its entirety by reference.

TECHNICAL FIELD

The present invention relates to a spectroscopic device and an imaging device.

BACKGROUND ART

A technique for acquiring images of several tens of wavelengths or more, called hyperspectral imaging, is being used. In the hyperspectral imaging technique, images can be acquired on a wavelength-by-wavelength basis by spectrally dispersing light in a desired waveband.

One example of the hyperspectral imaging technique is described in PTL 1. PTL 1 describes a scanning projection display device and the like. The scanning projection display device described in PTL 1 includes at least a slit member for outputting a one-dimensional image of an input image in which light rays of different wavelength regions are superimposed on one another, and a scanning mirror that scans light exiting from the slit and generates a scan image that is a two-dimensional image.

CITATION LIST

Patent Literature

PTL 1: Japanese Unexamined Patent Application Publication No. 2015-55819

SUMMARY OF INVENTION

Technical Problem

In the hyperspectral imaging and the like, it may need a long time to acquire an image relating to individual wavelengths into which light is spectrally dispersed. There is therefore a demand for further reduction in time and the like required for acquiring a spectrally-dispersed image as compared with the technique described in PTL 1 and the like.

The present invention has been made in order to solve the problem described above and a principal object of the present invention is to provide a spectroscopic device and the like that are capable of fast spectral dispersion.

Solution to Problem

A spectroscopic device according to one aspect of the present invention includes a modulation means for converting wavefront shapes of light according to wavelengths, and a demodulation means for changing a phase of light of a selected particular wavelength within light whose wavefront shapes have been converted, in such a way that the light changes into a predetermined state.

An imaging device according to one aspect of the present invention includes a collimator that changes light relating to a two-dimensional image to first parallel light, a spectroscopic device that changes a phase of light of a particular wavelength within the first parallel light in such a way that the light changes into parallel light, a pinhole optical system that forms an image of second parallel light exiting from the spectroscopic device, and an image sensor that takes an image of the second parallel light.

Advantageous Effects of Invention

According to the present invention, a spectroscopic device and the like that are capable of spectrally dispersing light fast can be provided.

BRIEF DESCRIPTION OF DRAWINGS

FIG. 3B is a diagram illustrating a concept of a spectroscopic method by a spectroscopic device according to the example embodiment of the present invention;

EXAMPLE EMBODIMENT

An example embodiment of the present invention will be described with reference to the accompanying drawings. Note that the term "planewave" as used in the following description refers to light whose surfaces with an identical light phase (i.e., wavefronts) are planar. In an example embodiment of the present invention, a planewave may include a wave (light) that contains a phase shift or an error of a degree that the wave can be practically treated as a planewave. Further, in the example embodiment of the present invention, the term "parallel light" refers to light in which light rays travel in parallel with one another. Parallel light may include light that contains a shift or an error of a degree that the light can be treated as parallel light.

(Principle of Spectroscopic Device)

A principle of a spectroscopic method used by a spectroscopic device according to the present example embodiment will be described next. In one aspect, the spectroscopic device according to the present example embodiment performs spectral dispersion by using a principle of adaptive optics. In other words, a spectroscopic device 100 according to the present example embodiment can be considered to be an application of the principle of adaptive optics to a spectroscopic technique.

Figure 3A:
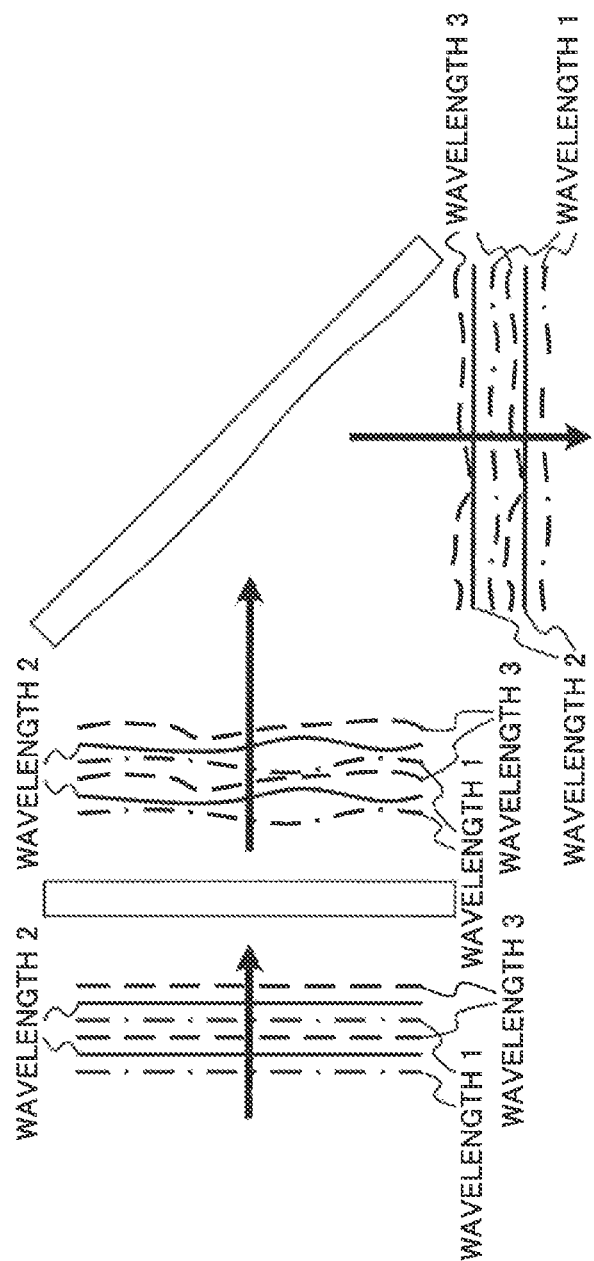
FIG. 3A is a diagram illustrating a concept of a spectroscopic method by a spectroscopic device according to the example embodiment of the present invention.

The principle of the spectroscopic method used by the spectroscopic device according to the present example embodiment will be described in detail by using FIG. 3A and FIG. 3B. A planewave such as white light to be spectrally dispersed is converted to a wave having wavefronts that are different from one wavelength to another, for example, by passing through a scatter plate. In the example illustrated in FIG. 3A, wavefronts of light of three wavelengths, wavelengths 1 to 3, contained in a planewave that has passed through the scatter plate are converted to shapes that are different from each other by the scatter plate.

Light whose wavefronts have been thus converted on a wavelength-by-wavelength basis is reflected, for example, by a mirror that has a mirror surface having a shape that eliminates differences in light path length among sections in a wavefront with respect to a particular wavelength, whereby the wavefront of the wavelength returns to a planewave. In FIG. 3A, an example is illustrated in which the light of the wavelength 2 within the light of the three wavelengths 1 to 3 returns to a planewave.

The shape of a wavefront of each wavelength is measured by using a wavefront shape sensor, for example. A mirror having a shape that eliminates differences in light path length among sections in a wavefront can be acquired by controlling a spatial light modulator (SLM), such as a deformable mirror, as appropriate. Specifically, light of a particular wavelength is returned to a planewave by controlling a mirror surface of the spatial light modulator in accordance with the shape of a wavefront of the particular wavelength that has been measured by the wavefront shape sensor. Further, when being converted to wavefronts having shapes that are different among wavelengths, the wavefronts of light of other wavelengths will take shapes different from a planewave.

By passing light including the wavefront of the particular wavelength that has become a planewave described above through an optical system including a pinhole, light of wavefronts other than the planewave is scattered by the pinhole. In other words, an image of the wavefront of the particular wavelength that has become the planewave can be formed on an imaging element. By forming an image of the wavefront of the particular wavelength that has become the planewave on an imaging element, a monochromatic image relating to the particular wavelength can be acquired. In the example illustrated in FIG. 3B, light other than light of a wavelength 2 which is a planewave within light of three different wavelengths 1 to 3 is scattered in an optical system including a pinhole. In other words, an image relating to the wavelength 2 is acquired in this example.

A monochromatic image relating to a particular wavelength can be acquired by the procedure described above. By repeating the procedure described above for a plurality of desired wavelengths, images relating to many wavelengths can be acquired.

Further, a deformable mirror operates at an operating frequency of several kHz (kilohertz), for example. In other words, a planewave of light of several thousand wavelengths, for example, can be acquired per second by using a deformable mirror as the spatial light modulator, for example, in the procedure described above.

(Spectroscopic Device and Imaging Device)

Figure 1:
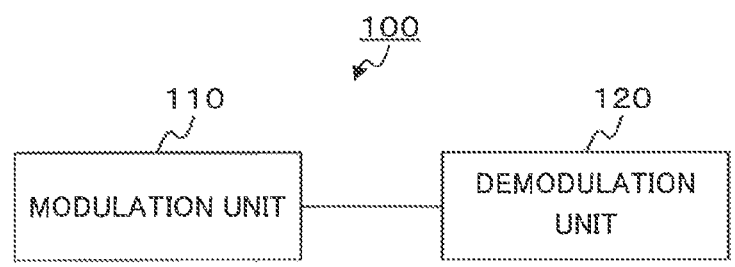
FIG. 1 is a diagram illustrating a spectroscopic device according to an example embodiment of the present invention.
Figure 2:
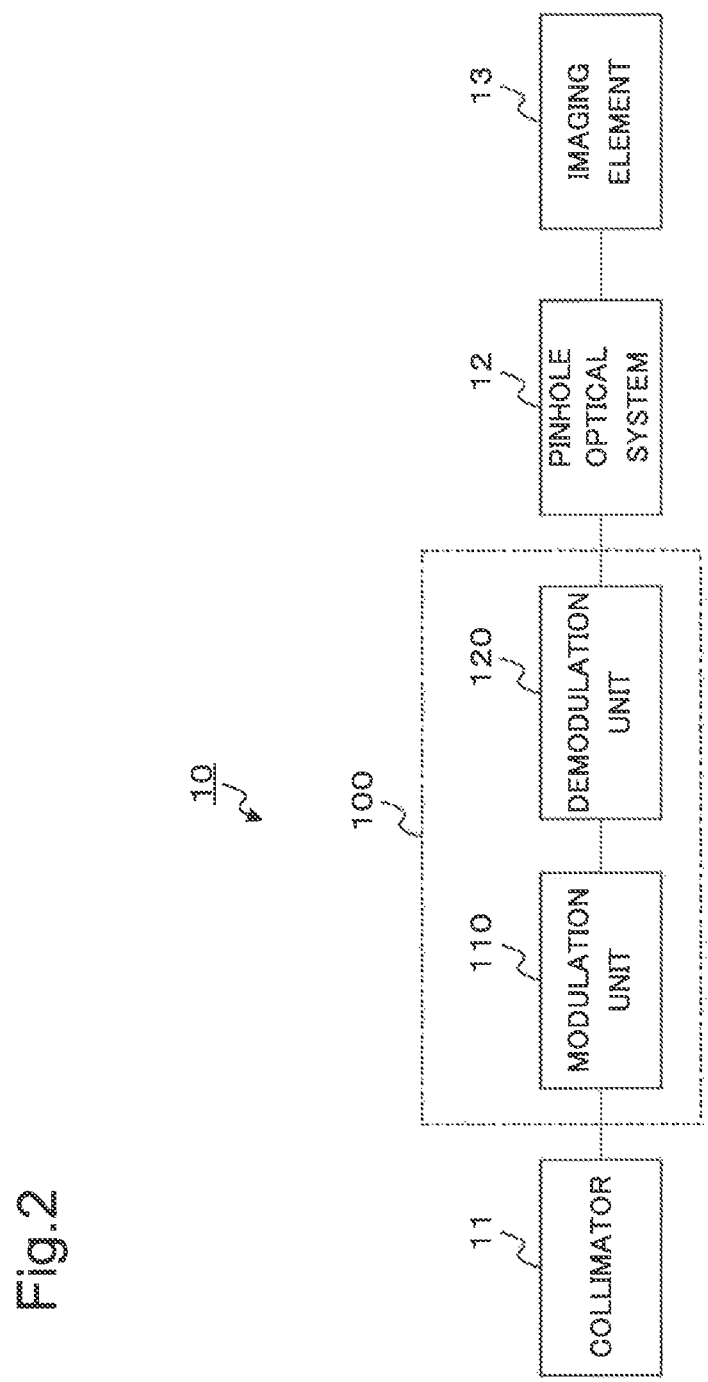
FIG. 2 is a diagram illustrating an imaging device according to the example embodiment of the present invention.

An example embodiment of the present invention will be described next. FIG. 1 is a diagram illustrating a spectroscopic device according to the present example embodiment. FIG. 2 is a diagram illustrating an imaging device according to the present example embodiment. The imaging device illustrated in FIG. 2 includes the spectroscopic device illustrated in FIG. 1.

As illustrated in FIG. 1, the spectroscopic device 100 according to the first example embodiment of the present invention includes a modulation unit 110 and a demodulation unit 120. The modulation unit 110 converts wavefront shapes of light in accordance with wavelengths. The demodulation unit 120 changes a phase of light of a selected particular wavelength within light whose wavefront shapes have been converted by the modulation unit 110, in such a way that the light changes into a predetermined state. For example, the demodulation unit 120 changes the phase of light by aligning light of a selected particular wavelength within the light whose wavefront shapes have been converted by the modulation unit 110, in such a way that the light becomes a planewave.

Further, as illustrated in FIG. 2, an imaging device 10 according to the first example embodiment of the present invention includes a collimator 11, the spectroscopic device 100 described above, a pinhole optical system 12, and an imaging element 13. The collimator 11 changes light relating to a two-dimensional image of a target object or the like to parallel light. When light changed to parallel light by the collimator 11 enters the spectroscopic device 100, the spectroscopic device 100 changes a phase of light of a selected particular wavelength, for example, in such a way that the light becomes a predetermined state such as parallel light, and outputs the light. The pinhole optical system 12 forms an image of light changed to a planewave by the spectroscopic device 100 on the imaging element 13. The pinhole optical system 12 includes a pinhole. The imaging element 13 takes an image of light of the particular wavelength that has been changed to parallel light.

Note that wavebands of light dealt with in the spectroscopic device 100 or the imaging device 10 are not limited. The spectroscopic device 100 or the imaging device 10 may deal with wavebands of visible light or may deal with wavebands of infrared light and ultraviolet light. Further, an image (a wavefront) is broken down into a plurality of two-dimensional pixels, for example, in accordance with pixels or the like of the imaging element 13. In other words, the modulation unit 110 converts a wavefront in units of a plurality of two-dimensional pixels, for example, in accordance with pixels or the like of the imaging element 13.

Figure 4:
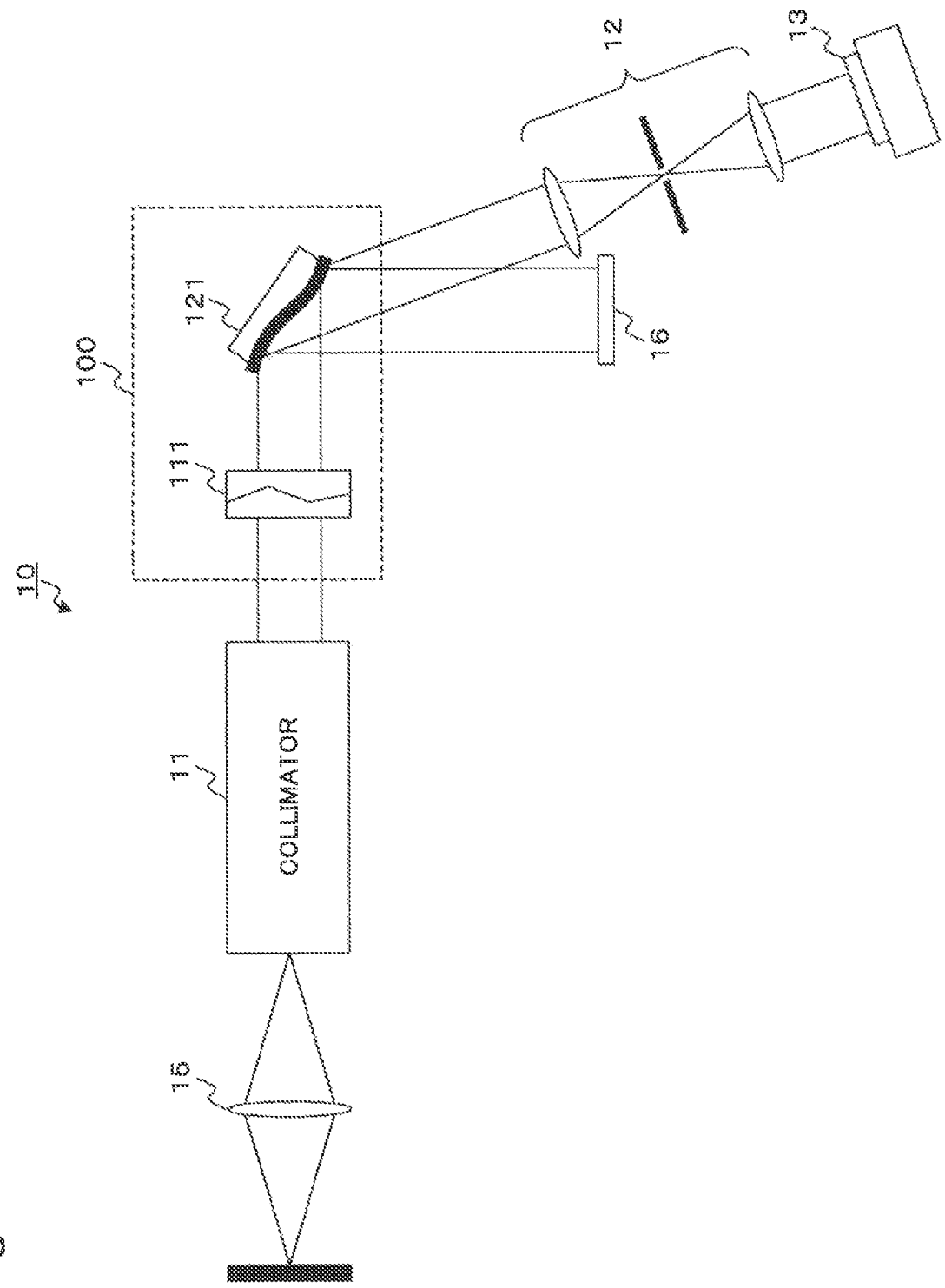
FIG. 4 is a diagram illustrating an example of a specific configuration of an imaging device according to the example embodiment of the present invention.

FIG. 4 illustrates an example of a specific configuration of the spectroscopic device 100 and the imaging device 10 including the spectroscopic device 100 according to the present example embodiment. As illustrated in FIG. 4, the imaging device 10 according to the present example embodiment includes a collimator 11, the spectroscopic device 100 described above, a pinhole optical system 12, and an imaging element 13. In the example illustrated in FIG. 4, a scatter plate 111 is used as a modulation unit 110 of the spectroscopic device 100 and a deformable mirror 121 is used as a demodulation unit 120. Further, in the example illustrated in FIG. 4, a block 16 that blocks returned light is provided as appropriate in order to prevent interference at the deformable mirror 121.

The collimator 11 changes light relating to a two-dimensional image relating to a target object to parallel light. A known means such as a collimator lens is used as the collimator 11. A two-dimensional image to be input into the collimator 11 can be acquired by using a lens 15 or the like, for example, as illustrated in FIG. 4. In the example illustrated in FIG. 4, a lens 15 adapted to the type or the like of a target object is used as appropriate.

The pinhole optical system 12 includes at least a pinhole. The pinhole optical system 12 forms an image of parallel light within light output from the spectroscopic device 100. Specifically, the pinhole optical system 12 scatters light that is not parallel light. In other words, the pinhole optical system 12 selectively passes light of a wavelength changed to parallel light in the spectroscopic device 100.

The imaging element 13 takes an image of light of a wavelength changed to parallel light in the spectroscopic device 100. A commonly-used image sensor such as a complementary metal oxide semiconductor (CMOS) image sensor or a charge coupled device (CCD) is used as the imaging element 13.

The scatter plate 111, which is equivalent to the modulation unit 110, converts a wavefront shape in accordance with a wavelength by using chromatic dispersion of a substance (i.e. a difference in refractive index depending on wavelengths of light). Specifically, the scatter plate 111 has a configuration in which light path lengths that depend on wavelengths differ at least in a part of the scatter plate 111. Note that a light path length is expressed by the product of a distance over which light travels and a refractive index of a medium when the light travels through the medium.

Figure 5:
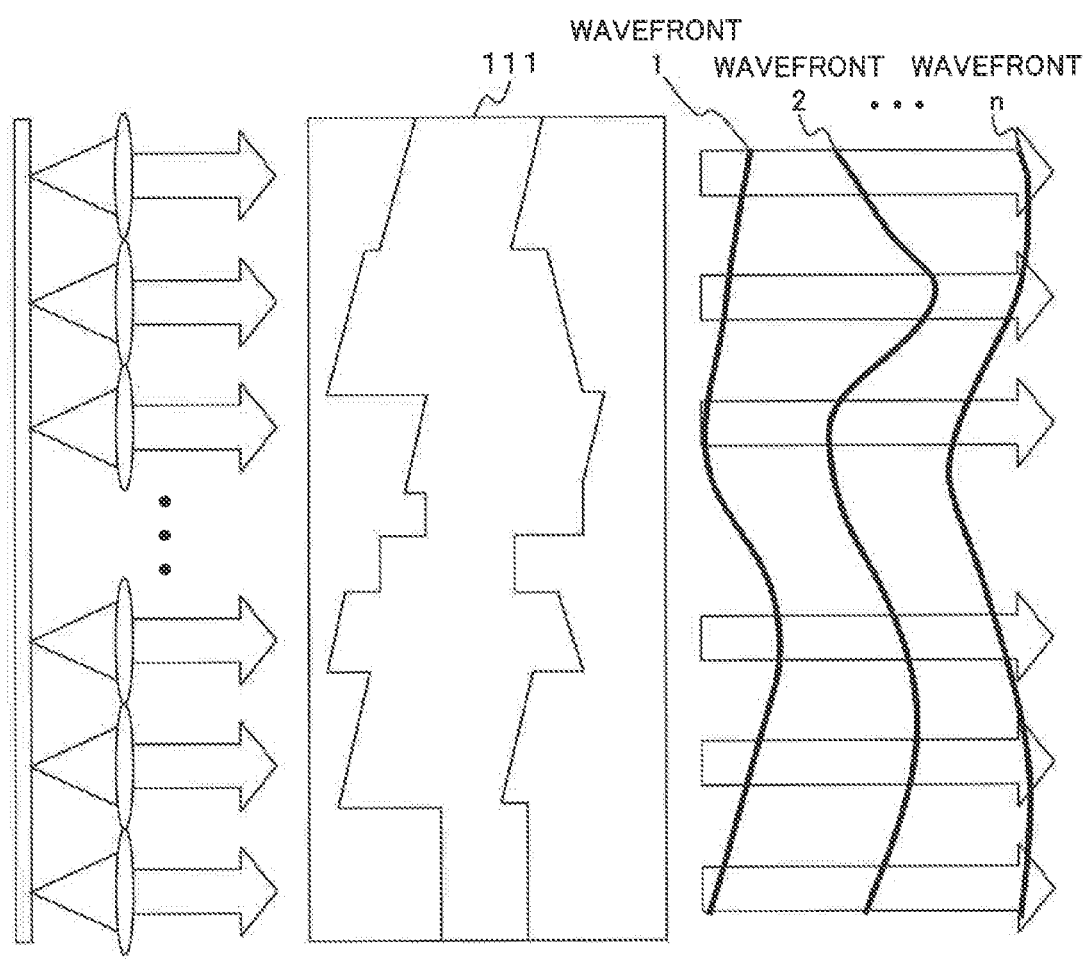
FIG. 5 is a diagram illustrating a scatter plate, which is an example of a modulation unit provided in a spectroscopic device according to the example embodiment of the present invention.

FIG. 5 illustrates an example in which the scatter plate 111 converts wavefront shapes. In FIG. 5, a cross-section of the scatter plate 111 is illustrated. Specifically, it is assumed in the example of FIG. 5 that the scatter plate 111 extends from the front toward the back of the figure. FIG. 5 illustrates an example in which parallel light is incident on the scatter plate 111 in each of predetermined pixels through a micro-lens array such as an array of gradient index (GRIN) lenses. Specifically, in the example illustrated in FIG. 5, light is narrowed in diameter by the micro-lens array (narrowed to a size sufficiently small with respect to the size of a pixel in the plane direction) and is incident on the surface of the scatter plate 111 on the left-hand side of FIG. 5 in each of the pixels. Then, the light incident on the scatter plate 111 is converted by the scatter plate 111 in such a way that the light takes different wavefront shapes among different wavelengths of wavefronts 1 to n (where n is a natural number). In other words, the scatter plate 111 converts the wavefront shapes of the light which is parallel light in such a way as to become deformative wavefronts that are different depending on wavelengths of the light. The light whose wavefront shapes have been converted exits from the surface of the scatter plate 111 on the right-hand side of FIG. 5. The shape of the outline of the surface of the scatter plate 111 on which light is incident or from which light exits is determined as appropriate in accordance with light that is incident on the scatter plate 111 or the like. The surface of the scatter plate 111 on which light is incident or from which light exits is rectangular in shape, for example.

The deformable mirror 121, which is equivalent to the demodulation unit 120, is a mirror whose mirror surface can be deformed. The deformable mirror 121 changes a phase of light of a selected wavelength within the light whose wavefront shapes have been converted by the scatter plate 111, by deforming the mirror surface in such a way that the light changes into a predetermined state. Specifically, the deformable mirror 121 changes a phase in such a way that light of a selected wavelength becomes parallel light, in this case, by deforming its mirror surface in accordance with a wavefront shape of the light. In this case, wavefronts of light of the other wavelengths become different from the wavefront of the parallel light.

Further, the deformable mirror 121 allows a phase to change in such a way that light of a plurality of different wavelengths becomes parallel light by deforming its mirror surface in accordance with a wavefront shape of each wavelength. In this case, a phase is changed in such a way that each of light rays of a plurality of wavelengths becomes parallel light by deforming the mirror surface of the deformable mirror 121 in series, for example, in accordance with a wavefront shape of each wavelength converted by the modulation unit 110.

(Details of Configuration of Spectroscopic Device)

Details of a configuration and conditions relating to an operation of each component of the spectroscopic device 100 according to the present example embodiment will be described next. It is assumed in the following description that the modulation unit 110 is a scatter plate 111 and the demodulation unit 120 is a deformable mirror 121.

Figure 6:
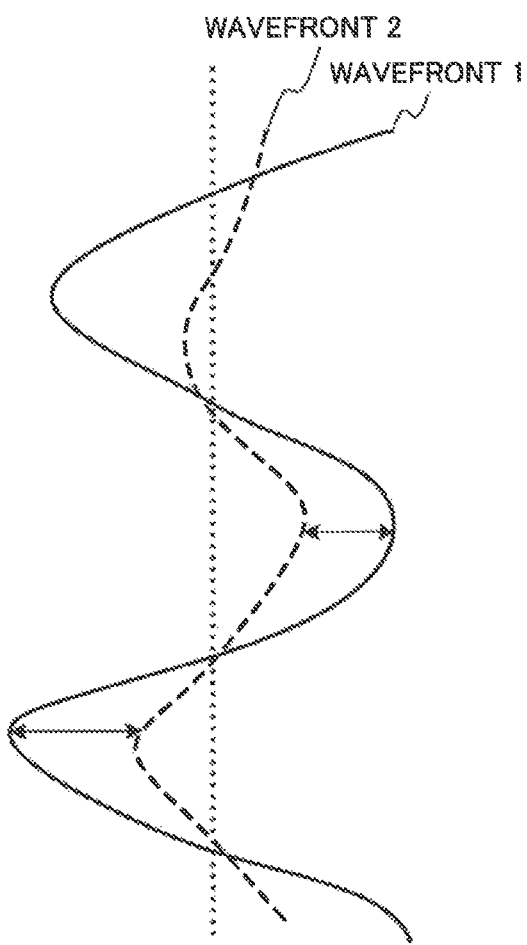
FIG. 6 is an example illustrating a condition of a difference in wavefront shape distinguished in a modulation unit.

The modulation unit 110 will be described first. As described above, the scatter plate 111, which is the modulation unit 110, converts wavefront shapes of incident parallel light relating to a two-dimensional image in accordance with wavelengths. The scatter plate 111 converts each of the wavefront shapes of light of a plurality of wavelengths to the extent that the wavefront shapes can be distinguished by the deformable mirror 121. In particular, a difference in wavefront shape between two arbitrary wavefront shapes among light of a plurality of wavelengths in one or more pixels (i.e. a difference between light path lengths in at least one pixel) needs to be large as compared with the resolution of the deformable mirror 121. Specifically, when a difference between wavefront shapes of light of two wavelengths, which is indicated by arrows in FIG. 6, is greater in one or more pixels than the resolution of the deformable mirror 121, the deformable mirror 121 can change phases of the light of the two wavelengths individually.

Further, when a pixelwise difference in light path length of a wavefront shape from light of a particular wavelength is greater than a range of motion of the mirror surface of the deformable mirror 121, the deformable mirror 121 cannot deform the mirror surface in such a way that the light of the wavelength becomes a planewave. In other words, in this case, it is difficult to change a phase of a wavefront by the deformable mirror 121 in such a way that the light of the wavelength becomes a planewave. Therefore, when a wavefront shape is converted by the scatter plate 111, a pixelwise difference in light path length for each of the wavefronts of light of wavelengths to be dealt with needs to fall within the range of motion of the deformable mirror 121.

An example of relationship between conversion of wavefront shapes by scatter plate 111 and the number of wavelengths that can be distinguished by the deformable mirror 121 is as follows. It is assumed in this example that the resolution of the deformable mirror in a light incident direction thereof is 1 nm (nanometer). In this case, wavefronts of light of two wavelengths can be distinguished when there is a difference equal to or greater than 1 nm between the light path lengths of wavefront shapes of the light of the two wavelengths.

It is also assumed in this example that the scatter plate 111 is quartz glass having a thickness of 1 mm (millimeter) and wavelengths from 340 nm to 900 nm are to be measured. In this case, a difference in refractive index from light in this waveband is approximately 0.02692, based on the refractive index for light of 340 nm and the refractive index for light of 900 nm. A difference in light path length for light in the waveband can be obtained by multiplying the difference in refractive index by the thickness of the scatter plate 111 as $2.692*10^{-5}$ m (meters). Here, "*" represents multiplication. When the difference in light path length described above falls within the range of motion of the deformable mirror 121, the number of wavelengths (hereinafter sometimes referred to as "bands") that can be distinguished by the deformable mirror 121 can be obtained by dividing the difference in light path length by the resolution of the deformable mirror 121 as 26920 bands.

Material used for the scatter plate 111 is not particularly limited. The scatter plate 111 is preferably made of a material that has a high light transmittance and exhibits a large chromatic dispersion, for example. Making the scatter plate 111 of a material having a large chromatic dispersion results in a large difference in light path length depending on a wavelength. This means that a difference in wavefront shape between wavelengths becomes large. Accordingly, light rays of more wavelengths can be distinguished.

Materials that exhibit a large chromatic dispersion in general vary depending on wavelengths. When visible light rays are mainly dealt with, quartz glass, for example, is used. When near infrared rays or middle infrared rays are mainly dealt with, $CaF_2$ (calcium fluoride), for example, is used. When middle infrared rays or far infrared rays are mainly dealt with, ZnSe (zinc selenide), for example, is used.

Further, various examples of the configuration of the scatter plate 111 are conceivable for allowing light of many wavelengths to be converted to different wavefront shapes. By the scatter plate 111 converting light of many wavelengths to different wavefront shapes, phases of the light of many wavelengths can be matched. In other words, images of many wavelengths can be acquired by the scatter plate 111 converting light of many wavelengths to different wavefront shapes.

As an example, different regions in a surface of the scatter plate 111 may have different thicknesses. Specifically, projections and depressions may be formed at a surface of the scatter plate 111. The thickness of the surface of the scatter plate 111 can be varied, for example, depending on the region thereof in each pixel and the like. When the thickness of the scatter plate 111 varies, a difference in light path length between wavelengths varies. For example, when the thickness of the scatter plate 111 increases, the magnitude of a difference in light path length between wavelengths increases in proportion to the thickness of the scatter plate 111. Accordingly, by varying the thickness of the surface of the scatter plate 111 depending on the region, a difference in light path length between wavelengths according to the regions of the scatter plate 111 increases.

Further, the scatter plate 111 may be formed by combining a plurality of layers of an identical material or different materials. In this case, the scatter plate 111 may be formed by bonding a plurality of layers of an identical material or different materials with each other, or the like, or may be formed by providing a plurality of layers of an identical material or different materials with a space between the layers.

When the scatter plate 111 is formed by combining a plurality of layers, the plurality of layers are preferably made of materials having different chromatic dissipation properties, for example. By combining a plurality of materials having different chromatic dissipation properties, a difference in light path between wavelengths is increased as compared with a case where the scatter plate 111 is formed of a single material. As a result, a difference in wavefront shape between wavelengths increases. Accordingly, images of more wavelengths can be acquired.

In addition, even when the scatter plate 111 is formed by combining a plurality of layers, the thickness of the scatter plate 111 may be varied depending on a region in a surface. In this case, the thickness of each of the layers that constitute the scatter plate 111 may be varied depending on the region in a surface.

Further, the scatter plate 111 may have a configuration in which directions of travel of light are changed at least in a part depending on wavelengths. More specifically, a surface of the scatter plate 111 or a surface of each of the layers that constitute the scatter plate 111 may have shapes where different regions extend in a direction different from a direction perpendicular to the direction of travel of parallel light incident on the scatter plate 111. In other words, a surface of the scatter plate 111 may have a shape that is different from a planar shape. For example, at least one of surfaces of the scatter plate 111 may have a shape extending toward a direction oblique to the direction of travel of parallel light incident on the scatter plate 111. Different regions in a surface of the scatter plate 111 may extend in different directions. Note that the surfaces of the scatter plate 111 in this case include each surface of the plurality of layers that constitute the scatter plate 111.

The direction of travel of light that passes through the scatter plate 111 (i.e. a direction of the vector of light rays) can be changed by providing a shape in such a way that the direction in which a surface of the scatter plate 111 extends is different from the direction perpendicular to the direction of travel of parallel light. Further, by varying the direction in which a surface of the scatter plate 111 extends among the surfaces in the surface of the scatter plate 111, the direction of travel of light passing through each region in the surface of the scatter plate 111 can be changed. For example, the direction in which light passing through the scatter plate 111 travels can be changed in each pixel on a surface of the scatter plate 111. Further, changes in the direction of travel of light are different depending on wavelengths. In other words, by configuring the scatter plate 111 as described above, the direction of travel of light in individual regions in wavefronts varies among wavelengths. Specifically, large differences in wavefront shape are provided among wavelengths by a surface of the scatter plate 111 that extends in a direction oblique to the incident direction, as compared with a case where a surface of the scatter plate 111 extends only in the direction perpendicular to the incident direction. As a result, the number of wavelengths whose phases are matched by the deformable mirror 121 can be increased.

Further, surface roughness in the surfaces of the scatter plate 111 (including each surface of the plurality of layers constituting the scatter plate 111) may be varied depending on the region.

Further, a surface of the scatter plate 111 and each surface of the plurality of layers constituting the scatter plate 111 may be combined with these structures. Specifically, different regions in a surface of the scatter plate 111 may extend in different directions or have different thicknesses. Further, when the scatter plate 111 is formed by combining a plurality of scatter plates made of different materials, different regions in a surface of each of the scatter plates may extend in different directions. In this case, different regions in the surface may have different thicknesses.

Figure 7A:
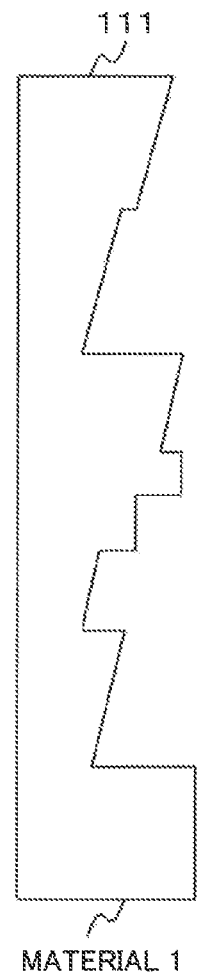
FIG. 7A is a diagram illustrating an example of a configuration of a scatter plate, which is a modulation unit.
Figure 7B:
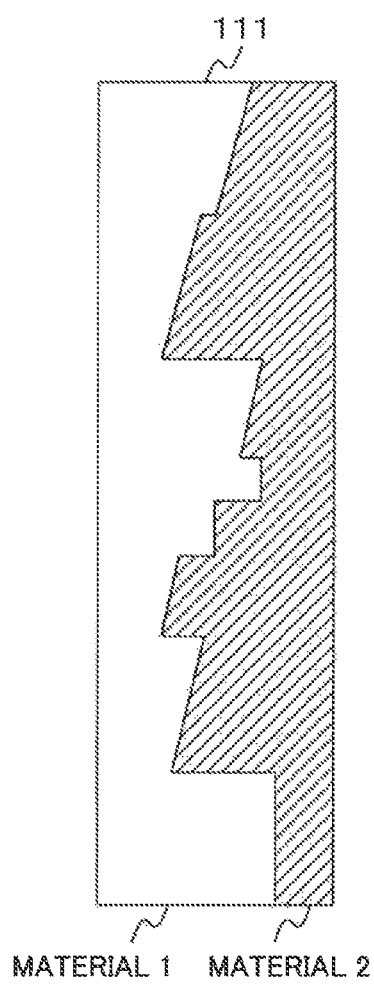
FIG. 7B is a diagram illustrating an example of a configuration of a scatter plate, which is a modulation unit.
Figure 7C:
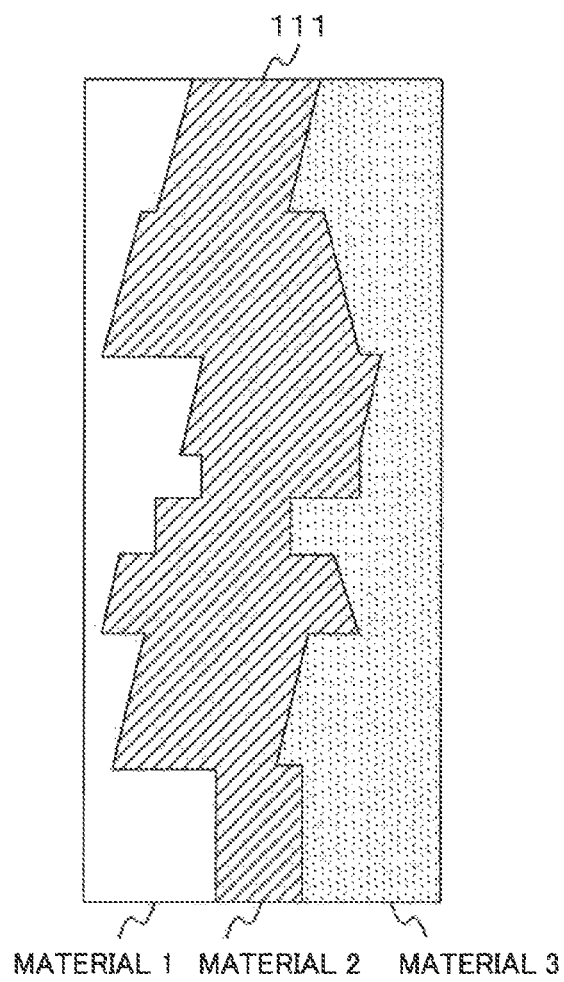
FIG. 7C is a diagram illustrating an example of a configuration of a scatter plate, which is a modulation unit.

Each of FIG. 7A to FIG. 7C illustrates a cross-section of an example of a specific configuration of the scatter plate 111. FIG. 7A illustrates an example of the scatter plate 111 made of a single material 1. FIG. 7B illustrates an example of the scatter plate 111 formed of layers of two different materials 1 and 2. Similarly, FIG. 7C illustrates an example of the scatter plate 111 formed of layers of three different materials 1 to 3. Note that it is assumed in the examples in FIG. 7A, FIG. 7B and FIG. 7C, parallel light is incident on the surface of each scatter plate 111 on the left-hand side in such a way as to be perpendicular to the surface from the left-hand side of the scatter plate 111.

In FIG. 7A, the shape of one surface of the scatter plate 111 differs from a planar shape. Specifically, the scatter plate 111 in the example in FIG. 7A is formed in such a way that parts of one surface of the scatter plate 111 face a direction oblique to the direction of travel of parallel light. Further, in the example in FIG. 7A, the scatter plate 111 is formed in such a way that parts of one surface of the scatter plate 111 have thicknesses different from the other parts. A one example, in the example in FIG. 7A, the bottom part of the scatter plate 111 in the figure has a larger thickness than the other parts.

In the examples in FIG. 7B and FIG. 7C, the shape of the surface of the scatter plate 111 at which the layers of different materials are in contact with each other is different from a planar shape, as in the example in FIG. 7A. Such a shape can provide differences in light path length and direction of travel of light among pixels at each of a plurality of wavelengths.

Note that while the materials 1 to 3 in the example in FIG. 7A, FIG. 7B and FIG. 7C are not particularly limited, materials that have chromatic dispersions different from one another, for example, are used. As described above, by using materials that have different chromatic dispersions for the scatter plate, differences in wavefront shape among wavelengths can be increased.

Note that a cross-sectional view of the scatter plate 111 is illustrated in each of the examples in FIG. 7A, FIG. 7B and FIG. 7C. However, the surface and the like of each scatter plate 111 may have various structures as described above in the depth direction of the figure as well.

Further, when a wavefront shape is converted to the extent that light in one pixel enters another pixel, crosstalk can occur between pixels. In order to avoid this, the direction of travel of light in each pixel needs to be determined in such a way that light in each pixel does not enter another pixel.

Figure 8:
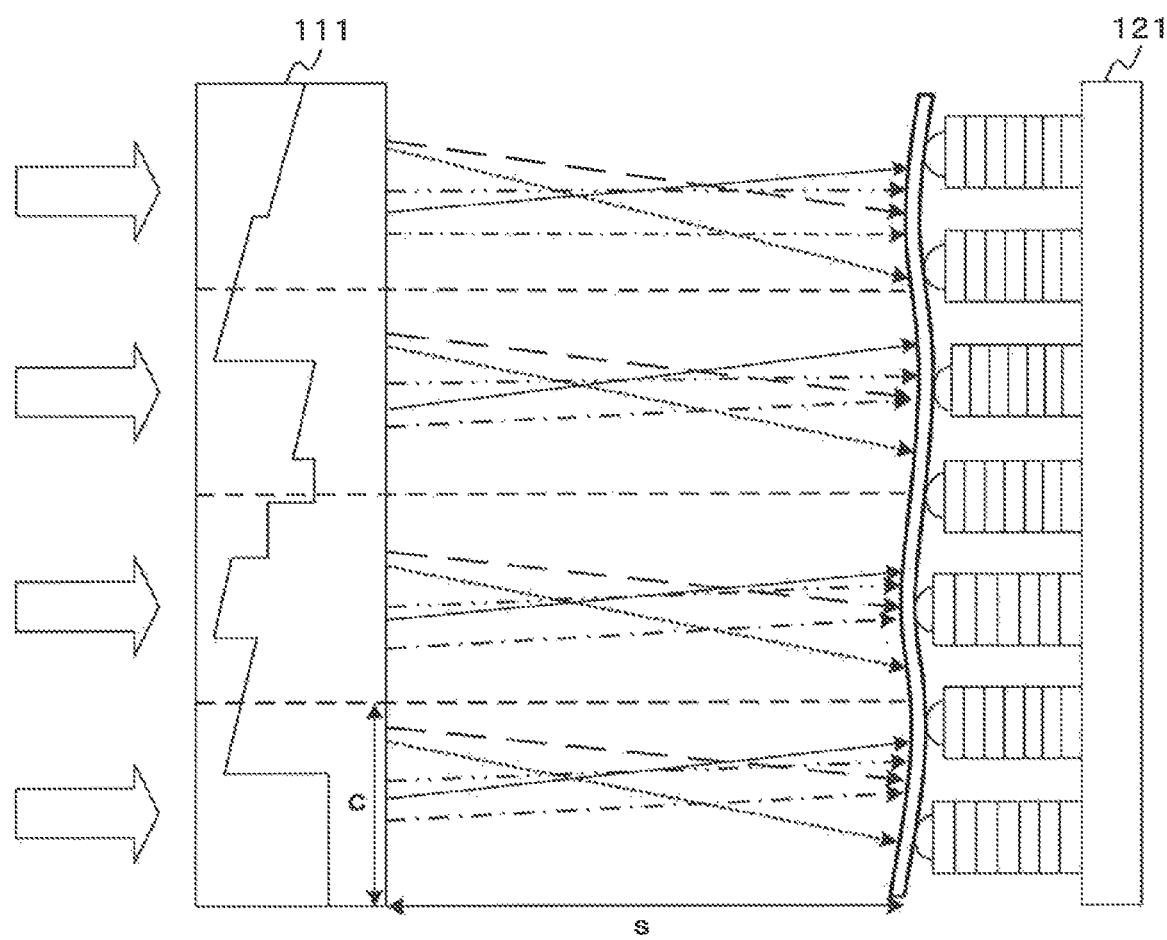
FIG. 8 is a diagram illustrating a condition for preventing light of each pixel from entering another pixel by conversion in the modulation unit.

FIG. 8 is a diagram relating to a condition of the direction of travel of light in each pixel. In the case where the demodulation unit 120 is a deformable mirror 121, it is assumed that the width of one pixel in a scatter plate 111 is c and the distance from the surface of the scatter plate 111 on the deformable mirror 121 side to the mirror surface of the deformable mirror 121 is s. In this case, an angle θ to the direction of travel of light in each pixel when the direction of travel has been changed by the scatter plate 111 needs to satisfy the relation with $\tan(\theta) = c/s$. Note that it is assumed in this case that light incident into each pixel has been narrowed in diameter by a micro-lens array or the like that uses GRIN lenses, for example.

The demodulation unit 120 will be described next. A deformable mirror 121, which is the demodulation unit 120, is a mirror whose mirror surface can be deformed by micro electro mechanical systems (MEMS) or an electromagnetic method. The deformable mirror 121 changes a phase of a wavefront by deformation of the mirror surface.

In the present example embodiment, a deformable mirror as described below, for example, is used as the deformable mirror 121. The deformable mirror 121 is a deformable mirror whose mirror surface is deformed by MEMS actuators, for example. In this case, the mirror surface has a shape of a square 4 mm on a side and the number of the actuators is 144. A distance between the actuators is 0.33 mm and the resolution (the minimum operating distance) is 1 nm. The operating frequency of the actuators is 8 kHz at the maximum. A shape of the mirror surface can be acquired based on a working distance of the actuators (i.e. a travel distance of the actuators in the direction perpendicular to the mirror surface when the mirror surface is planar) and a space between the actuators.

In the case where the demodulation unit 120 is a deformable mirror 121, the number of wavelengths that can be spectrally dispersed per unit time is determined depending on the operating frequency of the deformable mirror 121. When the operating frequency of the deformable mirror 121 is 8 kHz as described above, 8000 bands can be processed per second. For example, when spectral dispersion of 250 bands is required for a two-dimensional image, spectral dispersion is performed in approximately 0.03 seconds. In other words, in the spectroscopic device 100 according to the present example embodiment, for example, the use of the deformable mirror 121 as the demodulation unit 120 enables fast spectral dispersion in proportion to the operating frequency of the deformable mirror 121.

Note that the demodulation unit 120 may be achieved by a spatial light modulator of a type different from the deformable mirror 121, or the like. For example, a spatial light modulator that uses liquid crystal is used as the demodulation unit 120. In this case, a delay is provided to a phase in accordance with a wavelength by controlling the liquid crystal. Phases of light of a particular wavelength are matched by providing a delay according to the wavefront of light of the particular wavelength.

Further, the demodulation unit 120 may be achieved by using a method based on phase-shift interferometry. In this case, a transfer function relating to conversion of a phase by the scatter plate 111 is obtained based on a change in phase of each wavelength by the scatter plate 111 that has been acquired beforehand. Based on the transfer function, an image of light whose wavefront shapes have been converted on a wavelength-by-wavelength basis by the scatter plate 111 is taken and processing for changing a phase of light of a selected particular wavelength is performed on the taken image. A series of processing is achieved in an information processing device such as a personal computer (PC).

Specifically, the demodulation unit 120 may be able to change a phase in such a way that light of a selected wavelength within light whose wavefront shapes have been converted in accordance with wavelengths by the modulation unit 110 becomes a planewave. In this case, the demodulation unit 120 may be achieved by a mechanism different from the deformable mirror 121. The mechanism used as the demodulation unit 120 may be determined as appropriate depending on a required operating speed and other conditions. The demodulation unit 120 is preferably a mechanism that is capable of treating many bands fast, like the deformable mirror 121.

(Procedure for Adjusting Demodulation Unit 120).

Figure 9:
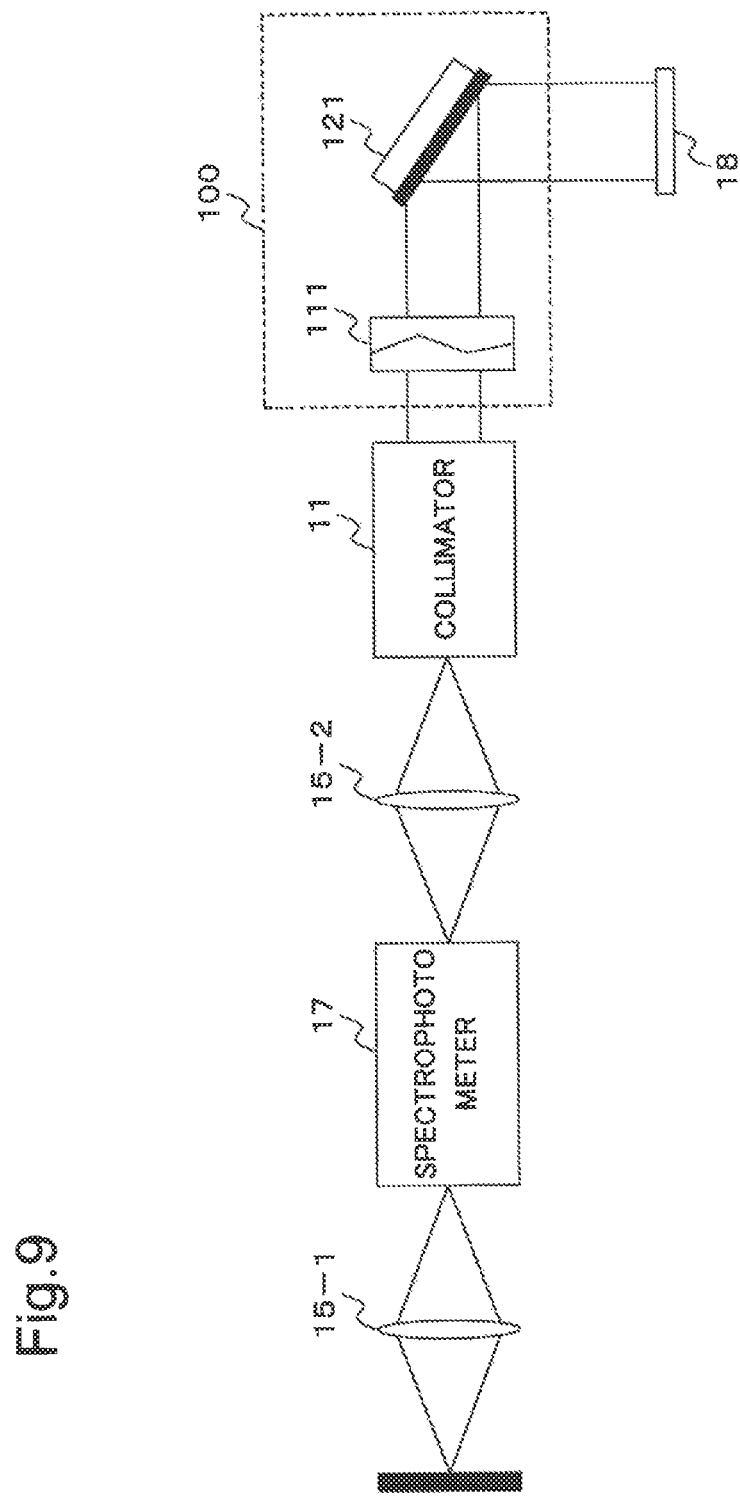
FIG. 9 is a diagram illustrating an example of a configuration used when adjustment of a demodulation unit is performed.

When a deformable mirror 121, for example, is used as the demodulation unit 120 for matching phases of light of a particular wavelength in the spectroscopic device 100 according to the present example embodiment, a shape of the mirror surface of the deformable mirror 121 according to wavelengths needs to be determined. When determining the shape of the mirror surface of the deformable mirror 121, a wavefront shape of each wavelength needs to be identified. A wavefront shape converted at the scatter plate 111, which is the modulation unit 110, can be acquired for each wavelength by following a procedure described below. FIG. 9 illustrates an example of a configuration used in adjustment of the demodulation unit 120.

First, monochromatic light of a particular wavelength, which is parallel light, is incident on the scatter plate 111. The monochromatic light can be acquired, for example, by inputting white light into a spectrophotometer 17 through a lens 15-1 or the like. By inputting the monochromatic light thus acquired into a collimator 11 through a lens 15-2 or the like, monochromatic light that is parallel light can be acquired. When the monochromatic light that is parallel light is incident on the scatter plate 111, the monochromatic light is converted to a wavefront shape according to the wavelength by the scatter plate 111.

Then, the monochromatic light whose wavefront shape has been converted is introduced into a wavefront shape sensor 18. In the example illustrated in FIG. 9, the monochromatic light is introduced into the wavefront shape sensor 18 through the deformable mirror 121. In this example, the deformable mirror 121 is controlled to become planar. Note that the monochromatic light whose wavefront shape has been converted may be introduced directly into the waveform shape sensor 18 rather than through the deformable mirror 121. The wavefront shape of the monochromatic light converted by the scatter plate 111 can be acquired by the wavefront shape sensor 18.

Once the wavefront shape has been acquired, a shape of the mirror surface of the deformable mirror 121 that changes light of the wavelength of the monochromatic light to a planewave is acquired based on the acquired wavefront shape. In this case, the shape of the mirror surface of the deformable mirror 121 can be acquired by using a known method.

By performing the operation described above on monochromatic light of other wavelengths, a shape of the mirror surface of the deformable mirror 121 that changes the monochromatic light of the other wavelengths to a planewave can be acquired. Monochromatic light of other wavelengths can be achieved such as by changing a diffraction wavelength of the spectrophotometer 17. Specifically, by repeatedly performing the operation described above for a plurality of wavelengths, the shape of the mirror surface of the deformable mirror 121 can be determined for a plurality of desired wavelengths.

Note that when different scatter plates 111 are used, a shape of the mirror surface of the deformable mirror 121 is acquired for each of the scatter plates 111. Further, when the demodulation unit 120 changes a phase of light of a particular wavelength in the case where a mechanism other than the deformable mirror 121 is used as the demodulation unit 120, information about a wavefront shape acquired as described above is used as appropriate.

As described above, the demodulation unit 120 in the spectroscopic device 100 according to the present example embodiment changes a phase of light of a particular wavelength within light whose wavefront shapes have been converted on a wavelength-by-wavelength basis by the modulation unit 110 such as the scatter plate 111, in such a way that the light changes into a predetermined state such as parallel light. In this way, the spectroscopic device 100 according to the present example embodiment can acquire an image at a particular wavelength.

Further, the deformable mirror 121 or the like is used as the demodulation unit 120. The deformable mirror 121 can operate at an operating frequency of several kHz. In other words, by using the deformable mirror 121 as the demodulation unit 120, the spectroscopic device 100 is capable of acquiring planewaves of light of several thousand bands per second, for example.

In contrast, in a known hyperspectral imaging technique, operations such as replacement of a filter for selecting a particular wavelength and scanning of light dispersed by a diffraction grating may be required for spectral dispersion. When these operations are required for acquiring an image at each wavelength, an amount of time of about several seconds may be required for acquiring an image at one wavelength. In addition, mechanisms for these operations may be required.

In other words, the spectroscopic device 100 according to the present example embodiment enables fast spectral dispersion. Further, the imaging device 10 including the spectroscopic device 100 according to the present example embodiment enables fast acquisition of images for many wavelengths for hyperspectral imaging.

(Application Examples of Spectroscopic Device and Imaging Device)

The spectroscopic device 100 and the imaging device 10 including the spectroscopic device 100 described above are applicable to various fields.

As an example, the imaging device 10 can be used in a way similar to an existing device for hyperspectral imaging. The imaging device 10 can be installed on a satellite, aircraft and the like, for example, and used for environmental surveillance and the like.

Further, as described above, the imaging device 10 enables fast acquisition of images for many wavelengths for hyperspectral imaging. Therefore, the imaging device 10 can be used in applications that require fast acquisition of images.

For example, by using the imaging device 10 in security or the like of an important facility, a target object can be quickly identified in detail and measures can be promptly devised based on identified information.

As another example, by using the imaging device 10 for a survey or the like on fire in a chemical plant or the like or pollutant emission from a factory or the like, the location where a fire occurs can be identified or spreading situation of a toxic substance can be observed or predicted.

Further, by using the imaging device 10 in fields such as life sciences and food sciences, detailed analysis of chemical reactions and the like that occur inside cells and microorganisms is facilitated. In particular, analysis of progress of the chemical reactions over time is facilitated by using the imaging device 10. Similarly, when the imaging device 10 is used as an endoscope or the like, a disorder or an area of resection can be detected or diagnosis of a condition in a living body can be quickly conducted. Consequently, distress in patients can be reduced.

Further, when the imaging device 10 capable of detecting infrared rays is mounted on an automobile or the like, surrounding people can be recognized during driving based on radiation wavelength properties of human bodies.

In addition, when the imaging device 10 is used in a way similar to an existing device for hyperspectral imaging, a degree of freedom of operation can be increased because images can be acquired fast.

Further, the spectroscopic device 100 can be used as a common spectroscopic device. In this case as well, the efficiency of processing can be improved because fast spectral dispersion can be performed.

While the present invention has been described with reference to an example embodiment thereof, the present invention is not limited to the example embodiment described above. Various modifications that can be understood by those skilled in the art can be made to configurations and details of the present invention within the scope of the present invention. Further, configurations in the example embodiment can be combined with one another without departing from the scope of the present invention.

Part or whole of the present invention can also be described, but not limited to, as in the following Supplementary Notes.

(Supplementary Note 1)

A spectroscopic device including:

a modulation means for converting wavefront shapes of light according to wavelengths; and a demodulation means for changing a phase of light of a selected wavelength within the light whose wavefront shapes have been converted, in such a way that the light changes into a predetermined state.

(Supplementary Note 2)

The spectroscopic device according to Supplementary Note 1, wherein the demodulation means changes a phase of light of the selected wavelength in such a way that the light becomes parallel light.

(Supplementary Note 3)

The spectroscopic device according to Supplementary Note 1 or 2, wherein the modulation means is a scatter plate in which a light path length of each wavelength differs at least in a part of the scatter plate.

(Supplementary Note 4)

The spectroscopic device according to Supplementary Note 3, wherein the scatter plate includes a region having a different thickness with respect to a direction of travel of the light.

(Supplementary Note 5)

The spectroscopic device according to Supplementary Note 3 or 4, wherein projections and depressions are formed in a surface of the scatter plate on which the light is incident or from which the light exits.

(Supplementary Note 6)

The spectroscopic device according to any one of Supplementary Notes 3 to 5, wherein at least a part of the scatter plate changes a direction of travel of the light according to a wavelength.

(Supplementary Note 7)

The spectroscopic device according to any one of Supplementary Notes 3 to 6, wherein a surface of the scatter plate on which the light is incident or from which the light exits includes a region extending in a direction oblique to a direction of travel of the light.

(Supplementary Note 8)

The spectroscopic device according to any one of Supplementary Notes 3 to 7, wherein the scatter plate includes a plurality of layers.

(Supplementary Note 9)

The spectroscopic device according to Supplementary Note 8, wherein at least one of the plurality of layers is formed of a material different from a material of another layer.

(Supplementary Note 10)

The spectroscopic device according to any one of Supplementary Notes 1 to 9, wherein the demodulation means is a spatial light modulator.

(Supplementary Note 11)

The spectroscopic device according to Supplementary Note 10, wherein the spatial light modulator is a deformable mirror.

(Supplementary Note 12)

The spectroscopic device according to Supplementary Note 10, wherein the spatial light modulator is a liquid-crystal spatial light modulation element.

(Supplementary Note 13)

The spectroscopic device according to any one of Supplementary Notes 1 to 9, wherein the demodulation means changes the phase into a predetermined state, based on phase-shift interferometry.

(Supplementary Note 14)

An imaging device including:

a collimator that changes light relating to a two-dimensional image to first parallel light;

the spectroscopic device according to any one of Supplementary Notes 1 to 13 that changes a phase of light of a particular wavelength within the first parallel light in such a way that the light becomes parallel light;

a pinhole optical system that forms an image of second parallel light exiting from the spectroscopic device; and an image sensor that takes an image of the second parallel light.

REFERENCE SIGNS LIST

100 Spectroscopic device
110 Modulation unit
120 Demodulation unit
10 Imaging device
11 Collimator
12 Pinhole optical system
13 Imaging element
15 Lens
16 Block

The invention claimed is:

1. A spectroscopic device comprising:
   a modulation unit converting wavefront shapes of light according to wavelengths; and
   a demodulation unit changing a phase of light of a selected wavelength within the light whose wavefront shapes have been converted, in such a way that the light changes into a predetermined state.

2. The spectroscopic device according to claim 1, wherein the demodulation unit changes a phase of light of the selected wavelength in such a way that the light becomes parallel light.

3. The spectroscopic device according to claim 1, wherein the demodulation unit is a scatter plate in which a light path length of each wavelength differs at least in a part of the scatter plate.

4. The spectroscopic device according to claim 3, wherein the scatter plate includes a region having a different thickness with respect to a direction of travel of the light.

5. The spectroscopic device according to claim 3, wherein projections and depressions are formed in a surface of the scatter plate on which the light is incident or from which the light exits.

6. The spectroscopic device according to claim 3, wherein at least a part of the scatter plate changes a direction of travel of the light according to a wavelength.

7. The spectroscopic device according to claim 3, wherein a surface of the scatter plate on which the light is incident or from which the light exits includes a region extending in a direction oblique to a direction of travel of the light.

8. The spectroscopic device according to claim 3, wherein the scatter plate includes a plurality of layers.

9. The spectroscopic device according to claim 8, wherein at least one of the plurality of layers is formed of a material different from a material of another layer.

10. The spectroscopic device according to claim 1, wherein the demodulation unit is a spatial light modulator.

11. The spectroscopic device according to claim 10, wherein the spatial light modulator is a deformable mirror.

12. The spectroscopic device according to claim 10, wherein the spatial light modulator is a liquid-crystal spatial light modulation element.

13. The spectroscopic device according to claim 1, wherein the demodulation unit changes the phase into a predetermined state, based on phase-shift interferometry.

14. An imaging device comprising:
- a collimator that changes light relating to a two-dimensional image to first parallel light;
- the spectroscopic device according to claim 1 that changes a phase of light of a particular wavelength within the first parallel light in such a way that the light becomes parallel light;
- a pinhole optical system that forms an image of second parallel light exiting from the spectroscopic device; and
- an image sensor that takes an image of the second parallel light.

* * * * *